United States Patent
Levitan et al.

(10) Patent No.: US 7,254,700 B2
(45) Date of Patent: Aug. 7, 2007

(54) FENCING OFF INSTRUCTION BUFFER UNTIL RE-CIRCULATION OF REJECTED PRECEDING AND BRANCH INSTRUCTIONS TO AVOID MISPREDICT FLUSH

(75) Inventors: David Stephen Levitan, Austin, TX (US); Brian William Thompto, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 216 days.

(21) Appl. No.: 11/056,512

(22) Filed: Feb. 11, 2005

(65) Prior Publication Data

US 2006/0184778 A1    Aug. 17, 2006

(51) Int. Cl.
*G06F 9/38* (2006.01)

(52) U.S. Cl. .................. 712/239; 712/205

(58) Field of Classification Search ............ None
See application file for complete search history.

(56) References Cited

U.S. PATENT DOCUMENTS 7,076,640 B2 * 7/2006 Kadambi .............. 712/244
2006/0190707 A1 * 8/2006 McIlvaine et al. ........ 712/219

* cited by examiner

*Primary Examiner*—Kenneth S. Kim
(74) *Attorney, Agent, or Firm*—Diana L. Roberts-Gerhardt; Mark E. McBurney; Schubert Osterrieder & Nickelson PLLC

(57) ABSTRACT

Systems and methods for handling the event of a wrong branch prediction and an instruction rejection in a digital processor are disclosed. More particularly, hardware and software are disclosed for detecting a condition where a branch instruction was mispredicted and an instruction that preceded the branch instruction is rejected after the branch instruction is executed. When the condition is detected, the branch instruction and rejected instruction are recirculated for execution. Until, the branch instruction is re-executed, control circuitry can prevent instructions from being received into an instruction buffer that feeds instructions to the execution units of the processor by fencing the instruction buffer from the fetcher. The instruction fetcher may continue fetching instructions along the branch target path into a local cache until the fence is dropped.

20 Claims, 5 Drawing Sheets

FENCING OFF INSTRUCTION BUFFER UNTIL RE-CIRCULATION OF REJECTED PRECEDING AND BRANCH INSTRUCTIONS TO AVOID MISPREDICT FLUSH

FIELD

The present invention is in the field of digital processing. More particularly, the invention is in the field of handling the event of a wrong branch prediction and an instruction rejection.

BACKGROUND

Many different types of computing systems have attained widespread use around the world. These computing systems include personal computers, servers, mainframes and a wide variety of stand-alone and embedded computing devices. Sprawling client-server systems exist, with applications and information spread across many PC networks, mainframes and minicomputers. In a distributed system connected by networks, a user may access many application programs, databases, network systems, operating systems and mainframe applications. Computers provide individuals and businesses with a host of software applications including word processing, spreadsheet, accounting, e-mail, voice over Internet protocol telecommunications, and facsimile.

Users of digital processors such as computers continue to demand greater and greater performance from such systems for handling increasingly complex and difficult tasks. In addition, processing speed has increased much more quickly than that of main memory accesses. As a result, cache memories, or caches, are often used in many such systems to increase performance in a relatively cost-effective manner. Many modern computers also support "multi-threading" in which two or more programs, or threads of programs, are run in alternation in the execution pipeline of the digital processor. Thus, multiple program actions can be processed concurrently using multi-threading.

Another method processor architects utilize to increase the performance of their designs is to increase the processor's clock frequency. For a given technology, a higher frequency allows for more cycles of work to be done within a unit of time. One impact of this approach is that the amount of circuitry that may be executed in a processor cycle is reduced. Therefore, a corresponding reduction in complexity of the design is required to maximize the frequency. Another impact of high frequency designs is that, as clock frequencies increase, the time it takes for signals to travel across a VLSI chip can become significant, such that it may take many processor cycles for a signal to travel from one element of the chip to another.

Most modern computers include at least a first level cache L1 and typically a second level cache L2. This dual cache memory system enables storing frequently accessed data and instructions close to the execution units of the processor to minimize the time required to transmit data to and from memory. The L1 cache is typically contained within the processor core near the execution units. The L2 cache is typically kept physically close to the processor core. Ideally, as the time for execution of an instruction nears, instructions and data are moved to the L2 cache from a more distant memory. When the time for executing the instruction is near imminent, the instruction and its data, if any, is advanced to the L1 cache.

As the processor operates in response to a clock, an instruction fetcher accesses instructions from the L1 cache. A cache miss occurs if the instructions sought are not in the cache when needed. The processor would then seek the instructions in the L2 cache. A cache miss may occur at this level as well. The processor would then seek the instructions from other memory located further away. Thus, each time a memory reference occurs which is not present within the first level of cache the processor attempts to obtain that memory reference from a second or higher level of memory. When an instruction cache miss occurs, the instruction fetcher suspends its execution of the instruction stream while awaiting retrieval of the instruction from system memory. In a multi-threaded processor, the instruction fetcher may operate on another thread of instructions while awaiting the retrieval of the instruction. The processor execution units may still be operating on previous elements of the instruction stream, or may be operating on another thread of instructions. The instruction fetcher may also begin to initiate additional requests for instructions data from the memory hierarchy based on the instruction stream that missed the cache.

A common architecture for high performance microprocessors includes the ability to execute one or more instructions on each clock cycle of the machine. Execution units of modern processors therefore have multiple stages forming an execution pipeline. On each cycle of processor operation, each stage performs a step in the execution of an instruction. Thus, as a processor cycles, an instruction is executed as it advances through the stages of the pipeline.

In a superscalar architecture, the processor comprises multiple special purpose execution units to execute different instructions in parallel. A dispatch unit rapidly distributes a sequence of instructions to different execution units. For example, a load instruction may be sent to a load/store unit and a subsequent branch instruction may be sent to a branch execution unit. The branch instruction may complete execution at an earlier stage in the pipeline than the load instruction even though the load instruction originally preceded the branch instruction. This is so because more stages may be required to execute the load instruction than to execute the branch instruction. Additionally, instructions may execute at a variable stage in the processor pipeline depending on inter-instruction dependencies and other constraints.

In a superscalar architecture, instructions may be completed in-order and out-of-order. In-order completion means no instruction can complete before all instructions dispatched ahead of it have been completed. Out-of-order completion means that an instruction is allowed to complete before all instructions ahead of it have been completed, as long as a set of predefined rules are satisfied. Microprocessors may support varying levels of out of order execution support, meaning that the ability to identify and execute instructions out of order may be limited. One major motivation for limiting out of order execution support is the enormous amount of complexity that is required to identify which instructions can execute early, and to track and store the out of order results.

Additional complexities arise when the instructions executed out of order are determined to be incorrect per the in-order execution model, requiring their execution to not impact the state of the processor when an older instruction causes an exception. As processor speeds continue to increase, it becomes more attractive to eliminate some of the complexities associated with out of order execution. This will eliminate logic (and its corresponding chip area, or "real estate") from the chip which is normally used to track out of order instructions, thereby allowing additional "real estate"

to become available for use by other processing functions. The reduction in complexity may also allow for a higher frequency design.

Modern processor architectures also include an instruction fetcher that fetches instructions from the L1 instruction cache. The instruction fetcher will send instructions to a decode unit and an instruction buffer. The dispatch unit receives instructions from the instruction buffer and dispatches them to the execution units. When the instruction fetcher receives a branch instruction, the instruction fetcher may predict whether the branch is taken and select a corresponding instruction path to obtain instructions to pass to the instruction buffer. When the branch instruction is executed in an execution unit, the processor can then determine whether the predicted instruction path was correct. If not, the processor redirects the instruction fetcher to the correct instruction address and flushes the instruction buffer and pipeline of instructions younger than the branch instruction.

The instruction buffer that receives instructions from the instruction fetcher may comprise an instruction recirculator to re-introduce instructions into the pipeline when an instruction has already been dispatched, but is unable to execute successfully at the time it reaches a particular stage in the pipeline. In this case, stalling the instruction in the pipeline until execution is possible may introduce significant complexities associated with coordinating the stalling action, especially in a superscalar architecture where various execution pipelines may be impacted by a stall. Additionally, in a multi-threaded processor, stalling an execution pipeline may consume execution resources that could be utilized by another thread. For these and other reasons, it is often desirable to recirculate an instruction from the instruction buffer instead. For example, at a stage of execution of a load instruction, the data called for by the instruction may not be in the L1 data cache. Execution of the instruction then becomes stalled and the instruction is said to be rejected. When an instruction is rejected it can be sent from the instruction buffer back to the execution units to execute it when the data it calls for is retrieved. In many cases though, the condition that prevents successfully execution is such that the instruction will be likely to execute successfully if re-executed as soon as possible. For example, an L1 data cache may have multiple sets of data, each of which may contain the data sought by a load instruction. When a load instruction executes, many processors utilize a mechanism of set prediction under which the load will choose a particular subset of the available sets to check for the data. If the set prediction is incorrect, the set predictor is updated, and the load must be re-executed to obtain data from the correct set. In this, and may other cases, it is desirable for the rejected instruction to be re-introduced to the execution units by the instruction buffer as quickly as possible.

In a processor with limited out-of-order facilities, an instruction reject may require the re-execution of subsequent instructions as well as the rejected instruction itself since the results of younger instructions may be required to be discarded. In this case the instruction buffer will re-read the rejected instruction and subsequent instructions so that they may be re-executed. When one of these younger instructions is a branch instruction that executes and was mispredicted the design may require complex circuitry to handle both the instruction reject and branch mispredict flush when they occur in close proximity, or when the branch mispredict flush occurs after an instruction reject. Designs may therefore take steps to avoid these complexities such as by suppressing the branch execution for instructions younger than a reject.

However, as noted above, in a high frequency design, it may take many cycles for signals to travel between units within the processor. When an instruction is rejected, the reject indication may take multiple cycles before it reaches the branch execution unit. Because branch instructions may complete execution coincident with, or prior to an older instruction that requires more stages for execution there many be multiple younger branch instructions that are executed before an older rejected instruction can signal the branch execution unit to suppress execution. Therefore, the complexities associated with an instruction reject and a branch misprediction flush in close proximity are exacerbated since multiple branch instructions may execute even after an older instruction has rejected. These complexities can be a major problem for high frequency designs.

SUMMARY

The problems identified above are in large part addressed by systems and methods for handling a mispredicted branch and an instruction rejection in a digital processor. Embodiments implement a method comprising detecting a condition where a branch instruction is executed and evaluated as mispredicted before an older, rejected instruction can suppress its execution. The method further comprises preventing instructions from being received into an instruction buffer when the condition is detected until the branch instruction is re-executed.

In one embodiment, a digital processor comprises an instruction fetcher that fetches a sequence of instructions. If a branch instruction is fetched, the instruction fetcher predicts whether the branch will be taken and accordingly selects an instruction path corresponding to the prediction. The embodiment further comprises a first execution unit that executes the branch instruction and determines a correct instruction path, and a second execution unit that executes a second instruction that precedes the branch instruction in the sequence of instructions. The embodiment further comprises detection circuitry that detects a condition where the second instruction is rejected and the branch resolves that the correct instruction path was not taken, the second instruction is rejected, and instructions subsequent to the branch instruction cannot be flushed. Further, the embodiment comprises control circuitry to block the flush request generated by the branch execution unit and to prevent new instructions from being received into the instruction buffer when the condition is detected, until the branch instruction is re-executed.

Another embodiment comprises a branch predictor that predicts whether a branch instruction is taken and selects an instruction path corresponding to the prediction. The embodiment provides a branch processing unit that executes the branch instruction to determine a correct instruction path. A flush control detection unit detects a condition where the correct instruction path was not selected by the branch prediction unit, a second instruction, previous to the branch I program order, is rejected, and instructions subsequent to the branch instruction cannot be flushed. A recirculation mechanism recirculates the second instruction and the branch instruction in response to the reject condition. A control unit prevents instructions from being stored in an instruction buffer in response to the detected condition until the branch instruction is re-executed.

BRIEF DESCRIPTION OF THE DRAWINGS

Other objects and advantages of the invention will become apparent upon reading the following detailed description and upon reference to the accompanying drawings in which, like references may indicate similar elements.

DETAILED DESCRIPTION OF EMBODIMENTS

The following is a detailed description of example embodiments of the invention depicted in the accompanying drawings. The example embodiments are in such detail as to clearly communicate the invention. However, the amount of detail offered is not intended to limit the anticipated variations of embodiments; but, on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

Figure 1:
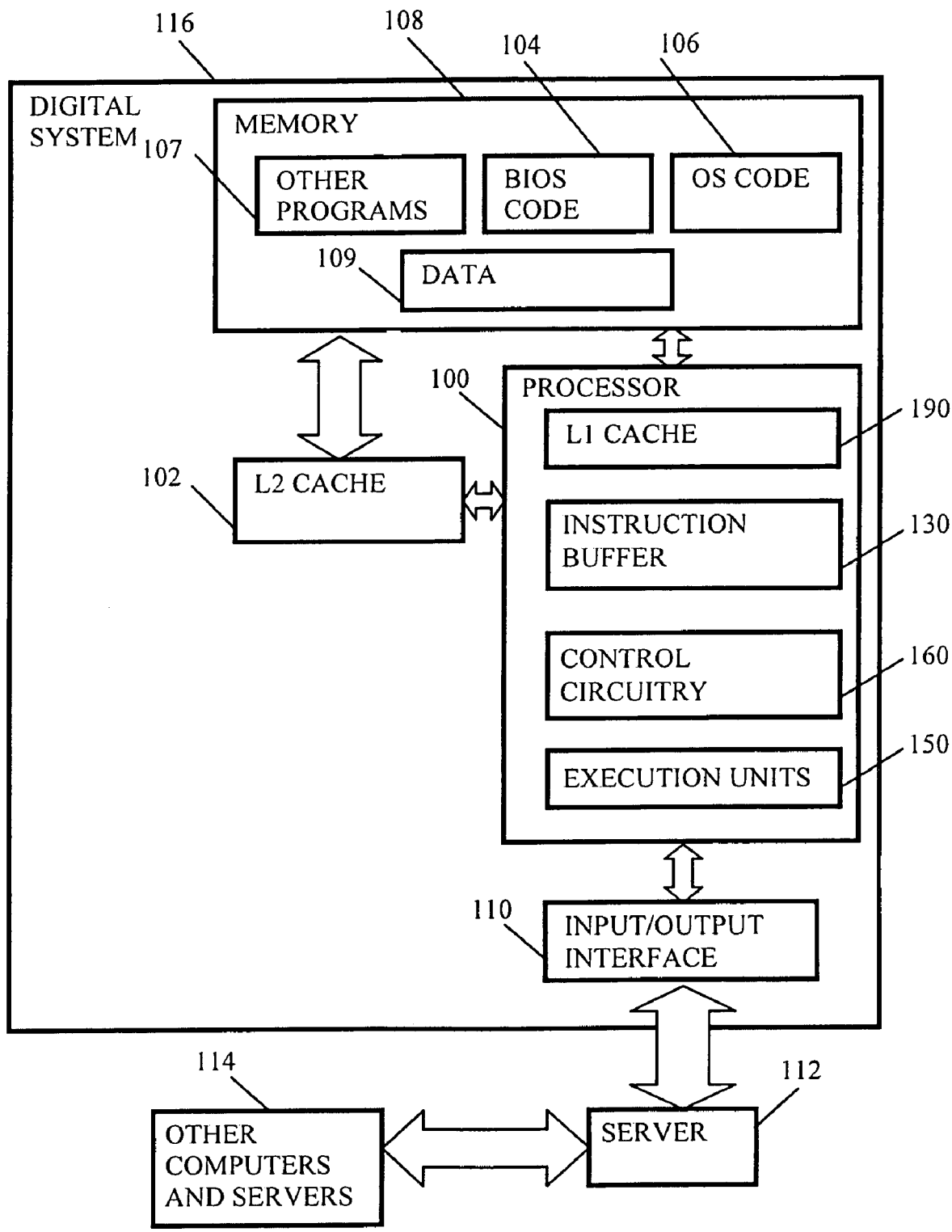
FIG. 1 depicts a digital system within a network; within the digital system is a digital processor.

Embodiments include a digital processor capable of detecting a condition where a branch instruction is mispredicted and an older instruction is rejected such that the instruction buffer and instruction pipeline cannot handle the branch flush due to the required handling of the reject condition. In response to the detected condition, the embodiment prevents instructions from being received into an instruction buffer until the branch instruction is re-executed. FIG. 1 shows a digital system 116 such as a computer or server implemented according to one embodiment of the present invention. Digital system 116 comprises a processor 100 that can operate according to BIOS Code 104 and Operating System (OS) Code 106. The BIOS and OS code is stored in memory 108. The BIOS code is typically stored on Read-Only Memory (ROM) and the OS code is typically stored on the hard drive of computer system 116. Memory 108 also stores other programs for execution by processor 100 and stores data 109 Digital system 116 comprises a level 2 (L2) cache 102 located physically close to multi-threading processor 100.

Processor 100 comprises an on-chip level one (L1) cache 190, an instruction buffer 130, control circuitry 160, and execution units 150. Level 1 cache 190 receives and stores instructions that are near to time of execution. Instruction buffer 130 forms an instruction queue and enables control over the order of instructions issued to the execution units. Execution units 150 perform the operations called for by the instructions. Execution units 150 may comprise load/store units, integer Arithmetic/Logic Units, floating point Arithmetic/Logic Units, and Graphical Logic Units. Each execution unit comprises stages to perform steps in the execution of the instructions received from instruction buffer 130. Control circuitry 160 controls instruction buffer 130 and execution units 150. Control circuitry 160 also receives information relevant to control decisions from execution units 150. For example, control circuitry 160 is notified in the event of a data cache miss in the execution pipeline.

Digital system 116 also typically includes other components and subsystems not shown, such as: a Trusted Platform Module, memory controllers, random access memory (RAM), peripheral drivers, a system monitor, a keyboard, one or more flexible diskette drives, one or more removable non-volatile media drives such as a fixed disk hard drive, CD and DVD drives, a pointing device such as a mouse, and a network interface adapter, etc. Digital systems 116 may include personal computers, workstations, servers, mainframe computers, notebook or laptop computers, desktop computers, or the like. Processor 100 may also communicate with a server 112 by way of Input/Output Device 110. Server 112 connects system 116 with other computers and servers 114. Thus, digital system 116 may be in a network of computers such as the Internet and/or a local intranet.

In one mode of operation of digital system 116, the L2 cache receives from memory 108 data and instructions expected to be processed in the processor pipeline of processor 100. L2 cache 102 is fast memory located physically close to processor 100 to achieve greater speed. The L2 cache receives from memory 108 the instructions for a plurality of instruction threads. Such instructions may include branch instructions. The L1 cache 190 is located in the processor and contains data and instructions preferably received from L2 cache 102. Ideally, as the time approaches for a program instruction to be executed, the instruction is passed with its data, if any, first to the L2 cache, and then as execution time is near imminent, to the L1 cache.

Execution units 150 execute the instructions received from the L1 cache 190. Execution units 150 may comprise load/store units, integer Arithmetic/Logic Units, floating point Arithmetic/Logic Units, and Graphical Logic Units. Execution units 150 comprise stages to perform steps in the execution of instructions. Further, instructions can be submitted to different execution units for execution in parallel. Data processed by execution units 150 are storable in and accessible from integer register files and floating point register files (not shown.) Data stored in these register files can also come from or be transferred to on-board L1 cache 190 or an external cache or memory.

An instruction can become stalled in its execution for a plurality of reasons. An instruction is stalled if its execution must be suspended or stopped. One cause of a stalled instruction is a cache miss. A cache miss occurs if, at the time for executing a step in the execution of an instruction, the data required for execution is not in the L1 cache. If a cache miss occurs, data can be received into the L1 cache directly from memory 108, bypassing the L2 cache. Accessing data in the event of a cache miss is a relatively slow process. When a cache miss occurs, an instruction cannot continue execution until the missing data is retrieved. While this first instruction is waiting, feeding other instructions to the pipeline for execution is desirable.

Figure 2:
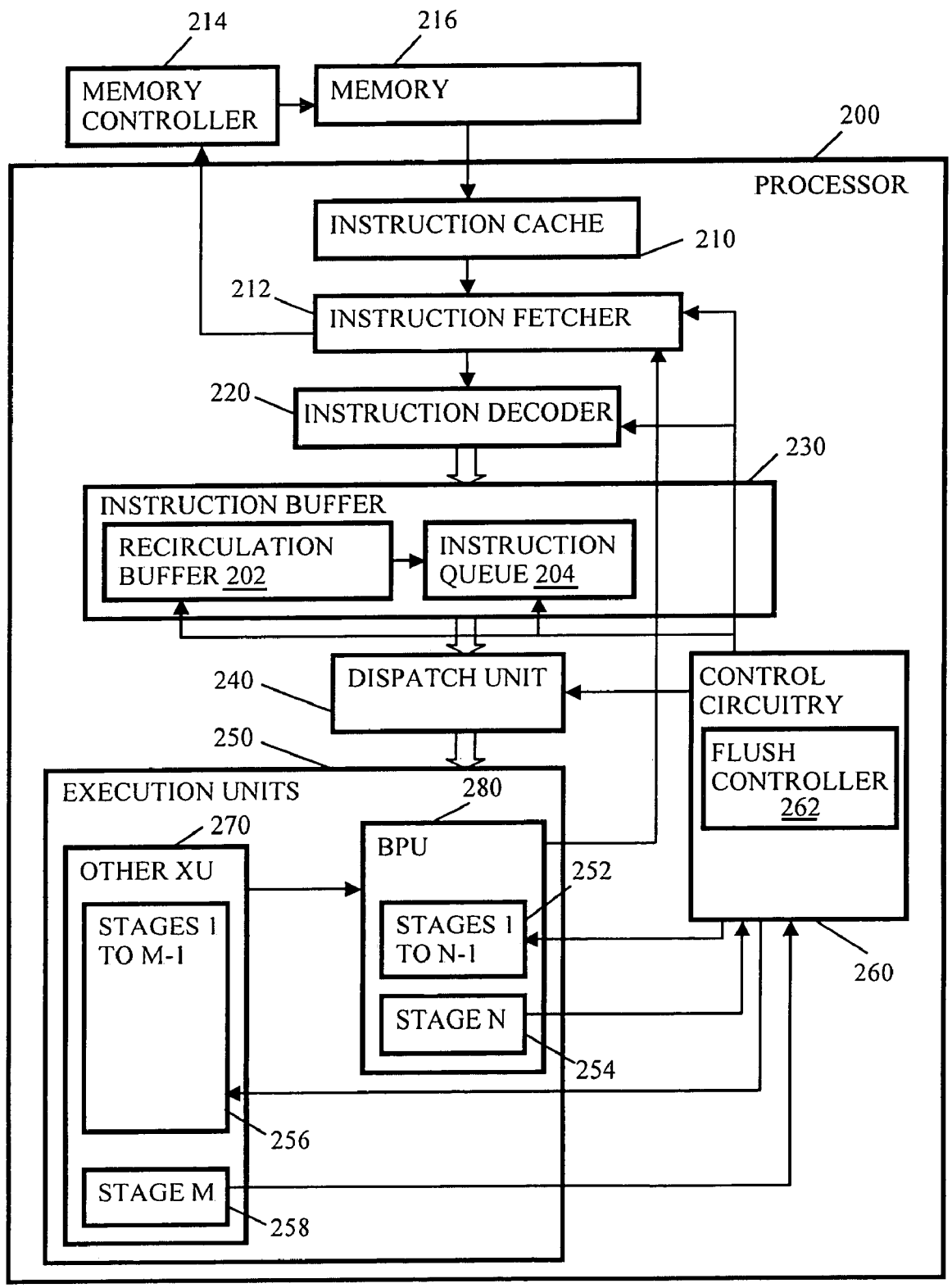
FIG. 2 depicts a digital processor that handles mispredicted branch instructions and rejected instructions.

FIG. 2 shows an embodiment of a processor 200 that can be implemented in a digital system such as digital system 116. A level 1 instruction cache 210 receives instructions from memory 216 external to the processor, such as level 2 cache. In one embodiment, as instructions for different threads approach a time of execution, they are transferred from a more distant memory to an L2 cache. As execution time for an instruction draws near it is transferred from the L2 cache to the L1 instruction cache 210.

An instruction fetcher 212 maintains a program counter and fetches instructions from instruction cache 210 and from more distant memory 216 that may include a L2 cache. The program counter of instruction fetcher 212 comprises an address of a next instruction to be executed. The program counter may normally increment to point to the next sequential instruction to be executed, but in the case of a branch instruction, for example, the program counter can be set to point to a branch destination address to obtain the next instruction. In one embodiment, when a branch instruction is received, instruction fetcher 212 predicts whether the branch is taken. If the prediction is that the branch is taken, then instruction fetcher 212 fetches the instruction from the branch target address. If the prediction is that the branch is not taken, then instruction fetcher 212 fetches the next sequential instruction. In either case, instruction fetcher 212 continues to fetch and send to decode unit 220 instructions along the instruction path taken. After many cycles, the branch instruction is executed in execution units 250 and the correct path is determined. If the wrong branch was predicted, then the pipeline must be flushed of instructions younger than the branch instruction. Preferably, the branch instruction is resolved as early as possible in the pipeline to reduce branch execution latency. That is, we want to determine if the prediction was wrong as early as possible so that the correct instruction path can be selected as soon as possible.

Thus, instruction fetcher 212 communicates with a memory controller 214 to initiate a transfer of instructions from a memory 216 to instruction cache 210. Instruction fetcher retrieves instructions passed to instruction cache 210 and passes them to an instruction decoder 220. Instruction fetcher 212 also performs pre-fetch operations in which data is requested speculatively for potential future instructions from the memory controller 214 based on the value of the program counter.

Instruction decoder 220 receives and decodes the instructions fetched by instruction fetcher 212. The decoder 220 may extract information from the instructions used by the instruction dispatch unit 240. This information may be stored in the instruction buffer 230.

Instruction buffer 230 receives the decoded instructions from instruction decoder 220. Instruction buffer 230 comprises memory locations for a plurality of instructions. Instruction buffer 230 may reorder the order of execution of instructions received from instruction decoder 220. Instruction buffer 230 thereby provides an instruction queue 204 to provide an order in which instructions are sent to a dispatch unit 240. For example, in a multi-threading processor, instruction buffer 230 may form an instruction queue that is a multiplex of instructions from different threads. Each thread can be selected according to control signals received from control circuitry 260. Thus, if an instruction of one thread becomes stalled, an instruction of a different thread can be placed in the pipeline while the first thread is stalled.

Instruction buffer 330 may also comprise a recirculation buffer mechanism 202 to handle stalled instructions. Recirculation buffer 202 is able to point to instructions in instruction buffer 230 that have already been dispatched, but are unable to execute successfully at the time they reach a particular stage in the pipeline. If an instruction is stalled because of, for example, a data cache miss, the instruction can be reintroduced into instruction queue 204 to be re-executed. This is faster than retrieving the instruction from the instruction cache. By the time the instruction again reaches the stage where the data is required, the data may have by then been retrieved. Alternatively, the instruction can be reintroduced into instruction queue 204 only after the needed data is retrieved. When an instruction is stalled and needs to be reintroduced to the pipeline it is said to be rejected. Frequently the condition that prevents successfully execution is such that the instruction will be likely to execute successfully if re-executed as soon as possible.

Dispatch unit 240 dispatches the instruction received from instruction buffer 230 to execution units 250. In a superscalar architecture, execution units 250 may comprise load/store units, integer Arithmetic/Logic Units, floating point Arithmetic/Logic Units, and Graphical Logic Units, all operating in parallel. Dispatch unit 240 therefore dispatches instructions to some or all of the executions units to execute the instructions simultaneously. Execution units 250 comprise stages to perform steps in the execution of instructions received from dispatch unit 240. Data processed by execution units 250 are storable in and accessible from integer register files and floating point register files not shown. Data stored in these register files can also come from or be transferred to an on-board data cache or an external cache or memory.

Dispatch unit 240, instruction buffer 230 and control circuitry 260 include instruction sequencing logic to control the order that instructions are dispatched to execution units 250. Such sequencing logic may provide the ability to execute instructions both in order and out-of-order with respect to the sequential instruction stream. Out-of-order execution capability can enhance performance by allowing for younger instructions to be executed while older instructions are stalled. However, out-of-order control circuitry typically adds significant complexity, and in many cases may therefore limit the overall performance of the processor because complex circuitry operates at a slower frequency than simplified circuitry. To achieve the highest possible performance, the sequencing logic may perform some out-of-order operations, but may limit the capability to do so. Therefore, when certain instructions are rejected from the pipeline, the sequencing logic may be required to re-dispatch both the rejected instruction and younger instructions due to such limitations.

Each stage of each of execution units 250 is capable of performing a step in the execution of a different instruction. In each cycle of operation of processor 200, execution of an instruction progresses to the next stage through the processor pipeline within execution units 250. Those skilled in the art will recognize that the stages of a processor "pipeline" may include other stages and circuitry not shown in FIG. 2. In a multi-threading processor, each pipeline stage can process a step in the execution of an instruction of a different thread. Thus, in a first cycle, a particular pipeline stage 1 will perform a first step in the execution of an instruction of a first thread. In a second cycle, next subsequent to the first cycle, a pipeline stage 2 will perform a next step in the execution of the instruction of the first thread. During the second cycle, pipeline stage 1 performs a first step in the execution of an instruction of a second thread. And so forth.

FIG. 2 shows a Branch Processing Unit (BPU) 280 within execution units 250. BPU 280 receives and processes branch instructions in stages one through n−1 (element 252). By an nth stage (element 254) BPU 280 resolves the branch instruction by determining if the branch is taken or not taken. As previously noted, when instruction fetcher 212 receives a branch instruction, it predicts whether the branch is taken. In the embodiment of FIG. 2, the predicted path is the correct one is determined when the branch instruction is resolved in the nth stage of execution. In another embodiment the branch may resolve in one of multiple stages, one through n. When the predicted path proves to be the correct one, then instruction fetcher 212 may continue along its current path. When the predicted path proves to be wrong, then instruction fetcher 212 redirects to fetch each next sequential instruction along the correct path as determined by BPU 280.

Thus, the result of the branch instruction is computed by stage n (element 254) of BPU 280 and communicated to control circuitry 260. When the incorrect path was taken, BPU 280 redirects instruction fetcher 212 to the correct instruction path. Also, if the wrong path was taken, all instructions introduced into the pipeline after the branch instruction should not be processed. Accordingly, these instructions are flushed. They are flushed by setting bits in the controls of the computational data path to prevent the instructions from updating the state of processor 200. Thus, when BPU 280 determines that a wrong path has been taken, a flush controller 262 may flush instructions younger than the branch instruction in each of the execution units 250. Flush controller 262 would also flush instructions younger than (i.e. subsequent in program order) the branch from instruction buffer 230, and instruction decoder 220.

FIG. 2 also shows another execution unit XU 270. XU 270 processes instructions in parallel with BPU 280 and other execution units 250. For example, XU 270 may be a load/store unit that processes load and store instructions. Since completion of execution of a branch instruction is moved to an earliest practical point in the pipeline stages, completion of many instructions may occur in a later stage in the pipeline than the stage of completion of the branch instruction. Thus, execution of an instruction by XU 270 may not complete until a stage m>n, but may also complete at a stage m<=n.

In the embodiment of FIG. 2, XU 270 comprises stages one to m-1 (element 256) and stage m (element 258). Suppose that in stage m of XU 270, after processing an instruction through stages one to m-1, a condition occurs that prevents the mth step from being performed correctly. For example, suppose that XU 270 is a load/store unit executing a load instruction when a data cache set mispredict occurs. This prevents performance of the mth step of execution in stage m of XU 270 until the set predictor is updated and the instruction can be re-executed. This is a load reject condition. When control circuitry 260 receives a signal from the mth stage of XU 270 that execution of the mth step of execution of the instruction cannot be performed, control circuitry 260 may signal recirculation buffer 202 to re-circulate the instruction. This introduces the instruction back into instruction queue 204. When the recirculated instruction again reaches the mth stage, the set may be predicted correctly and the data required to perform that step is likely to then be available. In another embodiment, the processor does not recirculate the instruction until the data is retrieved for a cache miss and the instruction is capable of being executed.

Thus, in the process of executing instructions, a branch may be mispredicted, calling for instruction flushing, and some instructions may become stalled, calling for recirculation of the stalled instruction. Suppose that instruction fetcher 212 receives a load instruction followed close by a branch instruction. Suppose further that instruction fetcher 212 mispredicts the correct path. The branch instruction is received by BPU 280 and the load instruction is received by a load/store unit 270. Because completion of execution of a branch instruction is moved to an earliest practical point in the pipeline stages, the branch instruction will be resolved at stage n, which may be earlier than the stage at which the load instruction is completed. Thus, in this example, completion of execution of the branch instruction can occur before completion of execution of the load instruction even though the load instruction was dispatched before or at about the same time the branch instruction was dispatched. In alternative examples, the branch may execute at the same time as, or later than the load instruction.

Suppose that at a stage m of XU 270, during execution of a load instruction, a set mispredict occurs. The load instruction cannot be completed and is rejected. In the absence of a younger mispredicted branch instruction, the normal step would be to recirculate the rejected load instruction and due to aforementioned limitations in out-of-order sequencing to also recirculate instructions younger than the rejected load. However, recall that when a branch is resolved as mispredicted, BPU 280 redirects instruction fetcher 212, and sends a request to flush controller 262 to cause instruction buffer 230 to be flushed. If a branch instruction younger than the load is resolved as mispredicted and the load is rejected, then the instruction buffer 230 and control circuitry 260 containing elements of the instruction sequencer and the flush controller 262 need to process both the recirculation request from unit XU 270 and the flush request from BPU 280. These requests for both recirculation and a flush of the instruction buffer 230 are further complicated since they may be received in any order. For example, if branch instructions execute in cycle n<m, then the request for flushing the instruction buffer from BPU 280 may be received by flush controller 262 in a cycle prior to the arrival of the reject indication from XU 270. However, when the load instruction rejects in cycle m, there may be pipelined branch instructions in stages from 1 through n that are still executing and may be mispredicted. Such branch instructions may therefore execute in a cycle subsequent or equal to the rejected load and the flush controller 262 may receive the load reject indication from XU 270 multiple cycles before receiving the instruction buffer flush request form BPU 280. Clearly, if the instruction buffer 230 dispatch unit 240 and sequencing logic are recirculating the load and subsequent instructions including the mispredicted branch and must correctly handle the flushing of instructions younger than the branch in coincidence, the control circuitry provided to handle such cases may be very complex. Thus, because it is desirable to reduce the complexity of the circuitry to yield an increase in the processor frequency and performance, control circuitry is provided to handle the case when an instruction that is older than the branch instruction is rejected and the branch instruction is resolved to be mispredicted with significantly less complexity.

In one embodiment, when XU 270 rejects a load instruction, it sends a reject indication to BPU 280 to cancel younger branch instructions and prevent them from executing, thereby limiting the maximum number of cycles between a reject indication, and a branch misprediction flush request for a younger branch, thereby having a potential reduction in complexity for instruction buffer 230 instruction dispatcher 240 and instruction sequencing logic. However, due to the nature of high frequency designs, the reject indication sent from XU 270 may take multiple cycles to reach BPU 280 and be processed. Therefore even with such a cancellation method, multiple branch instructions younger than the rejected load may execute after the load instruction such that the flush controller 262 will still need to handle cases where a branch flush and older load reject request may be received in any order.

In one embodiment, when BPU 280 resolves that the branch was mispredicted, it redirects instruction fetcher 212 to the address for the next instruction along the correct path. However, flush controller 262 does not immediately flush instruction buffer 230. Rather, flush controller 262 waits to determine if an older instruction (i.e. instruction preceding in program order) stalls in a stage subsequent to stage n. Thus, in an m-stage execution unit 270 with m>n, control circuitry 260 waits to see if an instruction stall occurs in any of stages n+1 through m of XU 270, during the time it takes for an instruction to propagate from stage n+1 to m. If no rejection occurs during this time, flush controller 262 may flush instruction buffer 230, and instruction buffer 230 proceeds to receive instructions along the correct path fetched by instruction fetcher 212. During the time that flush controller 262 is waiting for an older reject before processing the branch flush, the instruction fetcher 212 and decoder 220 may proceed with the retrieval of instructions along the correct execution path. Due to the nature of high frequency designs there may be many pipeline stages within instruction fetcher 212 and decoder 220. The delay in flushing the instruction buffer is therefore typically undetectable and will not adversely affect performance because it will overlap with a portion of the delay be between BPU 280 sending a redirect to the fetcher 212 and the arrival of the correct instructions at the instruction buffer 230 (i.e. the delay is "hidden").

If, however, a reject does occur, processor 200 implements a different process. BPU 280 redirects instruction fetcher 212 to the correct address, but flush controller 262 does not immediately flush the instruction buffer. Flush controller 262 determines the relative age of the stalled instruction and the branch instruction. If the load instruction is younger than the branch instruction, then the normal sequence progresses. If the load instruction is older than the branch instruction, control circuitry 260 causes instruction buffer 230 to recirculate the rejected instruction, and the branch instruction in the same sequence as before. Meanwhile, control circuitry 260 signals the instruction buffer to "fence" the instructions from the instruction fetcher 212 and decoder 220 by ignoring new instructions received. Note that while instruction buffer 230 fences off instructions from instruction fetcher 212, instruction fetcher 212 can still pre-fetch instructions along the correct instruction path by signaling memory controller 214 to cause memory 216 to forward instructions along the path to instruction cache 210.

When the instructions are recirculated, the branch instruction will be resolved at stage n as before, and BPU 280 redirects instruction fetcher 212 to the correct target address. Flush controller 262 again waits to see if an older instruction rejects during the time it takes for an instruction to propagate from stage n+1 to stage m. If an instruction reject occurs again, the process is repeated. When an instruction stall does not occur, control unit 260 flushes instruction buffer 230, and signals instruction buffer 230 to remove the fence and once again receive instructions from instruction fetcher 212. Now instruction fetcher 212 feeds to instruction buffer 230 instructions along the correct instruction path. The removal of the instruction fence is timed relative to the BPU 280 redirect such that the instructions along the correct instruction path are not fenced and enter the instruction buffer 230 given the pipeline delay from the redirect.

Significant advantages are attainted by using this approach of instruction fencing since the complexity of each component of the processor in handling a mispredicted branch with a rejected load is minimized. That is, each unit can behave naturally without excess complexities associated with these scenarios and the flush controller adds the needed coordination to conditionally fence the mispredicted branch flush. For example, the instruction fetcher 212 has no need to restore the program counter it maintains and may continue to pre-fetch normally, even while the fence is active. Also, the instruction buffer 230, dispatcher 240, execution units 250 and control logic 260 do not need to handle cases of undue complexity such as selective flushes of the instruction stream in near proximity to a recirculation event.

In the course of processing instructions an exception may occur that causes the processor to interrupt the normal processing of instructions. When this occurs, instruction fetcher 212 fetches new instructions to handle the cause of the exception. If this occurs while instruction buffer 230 is fencing off instructions from instruction fetcher 212, the exception condition cannot be processed. Thus, in case an exception occurs during fencing by instruction buffer 230, fencing is turned off to enable instruction buffer 230 to receive instructions from instruction fetcher 212.

In another embodiment, the instruction buffer 230 and instruction sequencing logic may be able to process a branch mispredict flush from BPU 280 when it occurs in a particular relation to an older reject condition from XU 270 with only limited additional complexity. For example, if a mispredicted branch is resolved prior to or coincident with the reject of an older instruction, the instruction buffer may be designed to selectively flush out instructions after the mispredicted branch. Therefore, if a mispredicted branch indication is received by flush controller 262 before or in the same cycle as the reject indication from an older load, both events may be processed normally, and the branch flush need not be fenced. In this case the branch flush need not flush when it is re-executed after being recirculated. However, in this example, the complexity associated with handling a branch mispredict indication if received after an older load reject indication may be much higher because the recirculation event initiated by the load reject may have already begun. Therefore, in accordance with the present invention, the flush control logic 262 would only block the branch flush of instruction buffer 230 and raise the fence to new instructions in the case where a mispredict indication from BPU 280 is received cycles subsequent to the cycle that an older reject indication from XU 270 is received.

In another embodiment not exclusive of those previously described, rejects are distinguished between those that should be processed quickly, such as a set mispredict condition, compared with those for which the stalling condition will not be satisfied for some time, such as a cache miss condition. In the case of a cache miss, or other similar condition, the recirculation event need not be initiated immediately after the reject event is detected by XU 270. In this case, XU 270 may send an additional indication that to flush controller 262 that the instruction fence need not be raised immediately. Further, XU 270 may not send a cancel indication to BPU 280 in this case to allow for mispredicted branches in the execution pipeline to refetch the correct instruction paths and flush the instruction buffer 230. Once the stall condition removal is eminent, XU 270 may send a cancellation request to BPU 280 and an indication to flush controller 262 to recirculate. BPU 280 and flush controller 262 may treat this event in a similar manner to the aforementioned handling of a "quick" load reject event, potentially raising the instruction buffer 230 fence and blocking a branch flush.

Figure 3:
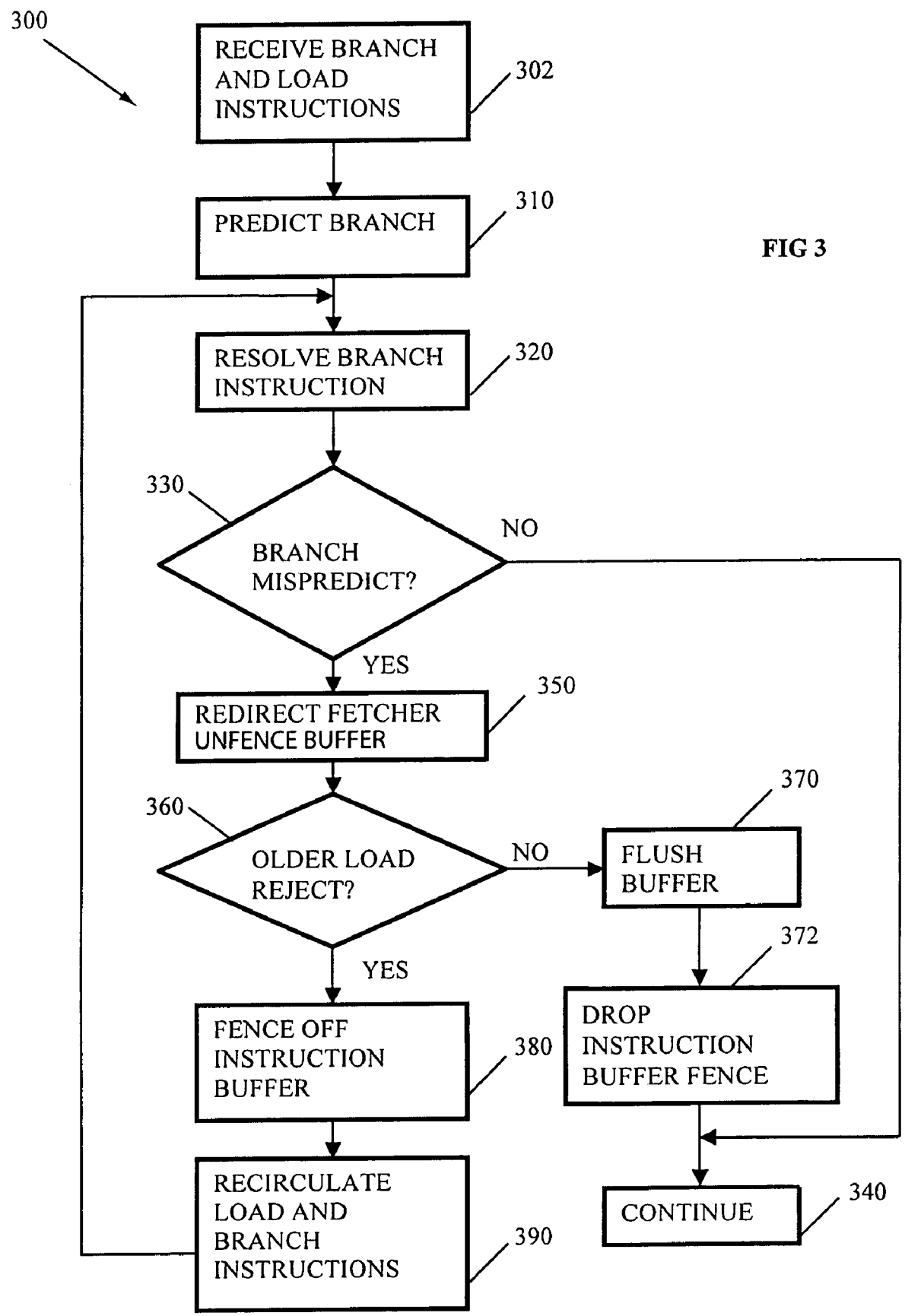
FIG. 3 depicts a flow-chart for detecting and handling a mispredicted branch and a rejected instruction.

FIG. 3 shows a flowchart 300 of one embodiment for a processor handling a branch misprediction and load rejection. In a first step, a load instruction is received followed by a branch instruction (element 302.) The processor then predicts the outcome of the branch instruction and follows the predicted path (element 310.) The processor then resolves the branch instruction (element 320) and determines whether the predicted path was wrong (element 330.)

If the predicted path is correct, then processing continues along the correct instruction path (element 340.)

If the predicted path is wrong, then the processor redirects the fetcher to the correct address (element 350). The processor then determines if a load instruction older than the branch instruction has already rejected such that the branch flush cannot be handled (as described previously) (element 360.) If not, the processor flushes the pipeline and instruction buffer of instructions younger than the branch instruction (element 370.) The instruction buffer is then directed to drop the fence that is blocking new instructions from the instruction fetcher (element 372.) Then processor operation continues along the correct instruction path (element 340.) If a load reject does occur (element 360), then the instruction buffer is directed to fence off instructions from the instruction fetcher (element 380.) Also, the processor recirculates the load and branch instructions and the process repeats (element 390.)

Figure 4:
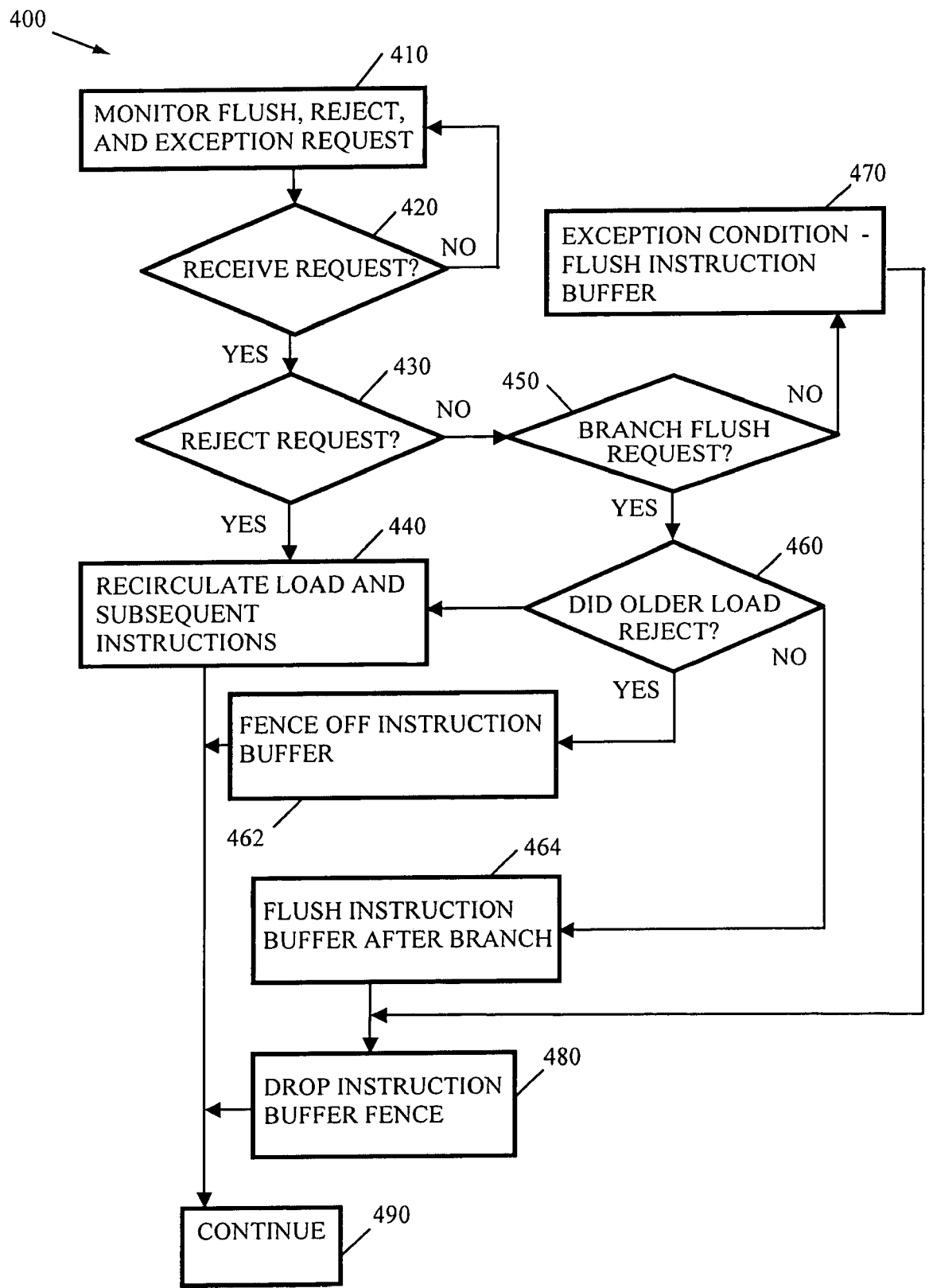
FIG. 4 depicts a flow-chart for a digital processor flush controller that handles mispredicted branch instructions and rejected instructions.

FIG. 4 depicts a flow-chart for a digital processor flush controller that handles mispredicted branch instructions and rejected instructions. In a first step, the processor monitors to determine if a flush request, reject condition, or exception request occurs (element 410 and 420.) If a reject request is received (element 430) then the load instruction and instructions subsequent thereto are recirculated (element 440), and the process continues (element 490.) If a branch flush request is received (element 450), the system determines if an older instruction has been rejected (element 460). If so, the processor fences off the instruction buffer (element 462.) Otherwise, the instruction buffer is flushed of instructions after the branch instruction (element 464.) Then, the processor drops the instruction buffer fence (element 480) and processing continues (element 490.) When an exception condition is detected, the instruction buffer is flushed (element 470.) Then, the processor drops the instruction buffer fence (element 480) and processing continues (element 490.)

Figure 5:
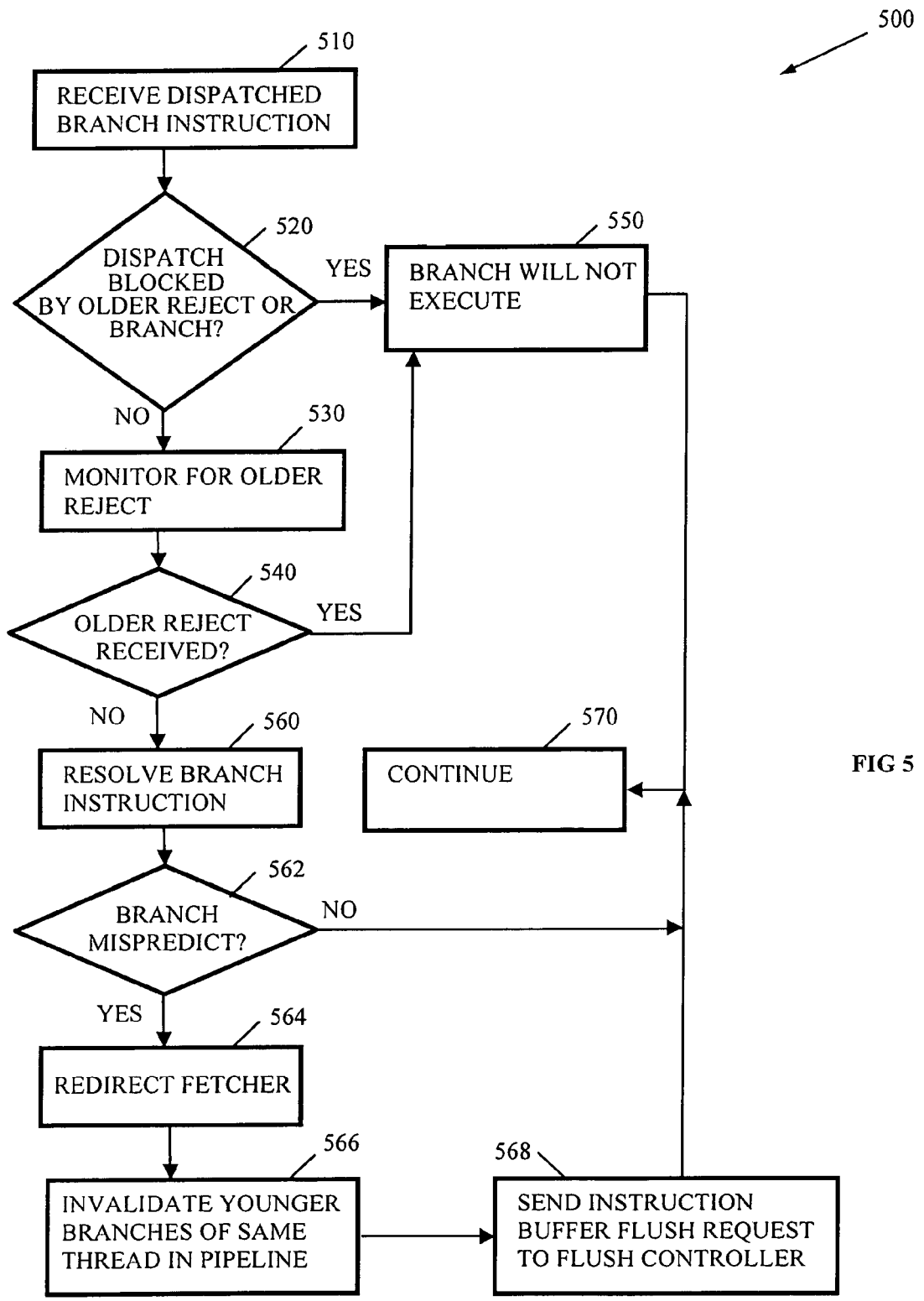
FIG. 5 depicts a flow-chart for a digital processor branch processing unit that handles a mispredicted branch and a rejected instruction.

FIG. 5 depicts a flow-chart for a digital processor branch processing unit that handles a mispredicted branch and a rejected instruction. In a first step, the branch processing unit receives a dispatched branch instruction (element 510.) The processor determines if dispatch is blocked by an older instruction reject or branch instruction (element 520.) If so, the branch instruction will not execute (element 550) and the process continues (element 570.) If not, the processor monitors to determine if there is an older reject condition (element 530.) If an older reject is received (element 540), the branch will not execute (element 550) and processing continues (element 570.) If an older reject is not received (element 540), then the branch instruction is resolved (element 560.) If resolution of the branch is not mispredicted (element 562), then processing continues (element 570). If the branch is mispredicted (element 562) then the processor redirects the instruction fetcher (element 564.) Then, the processor invalidates younger branch instructions of the same thread in the pipeline (element 566.) The processor also sends an instruction buffer flush request to the flush controller (element 568.) and processing continues (element 570.)

Although the present invention and some of its advantages have been described in detail for some embodiments, it should be understood that various changes, substitutions and alterations can be made herein without departing from the spirit and scope of the invention as defined by the appended claims. Although an embodiment of the invention may achieve multiple objectives, not every embodiment falling within the scope of the attached claims will achieve every objective. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for processing a branch mis-prediction and an instruction rejection in a digital processor, comprising:
   fetching a sequence of instructions including a branch instruction that calculates an address of an instruction to be executed if the branch is taken;
   predicting whether the branch will be taken and accordingly selecting an instruction path corresponding to the prediction;
   executing the branch instruction and determining a correct instruction path;
   detecting a condition where the correct instruction path was not selected, a second instruction that precedes the branch instruction in the sequence of instructions is rejected, and instructions subsequent to the branch instruction cannot be flushed; and
   if the condition is detected, preventing instructions from being received into an instruction buffer until the rejected instruction and the branch instruction are re-submitted for execution in the same order.

2. The method of claim 1, further comprising flushing the instruction buffer after the branch instruction is re-executed in response to the detected condition if the condition does not repeat.

3. The method of claim 1, further comprising re-enabling instructions to be received into the instruction buffer after the branch instruction is re-executed in response to the detected condition if the condition does not repeat.

4. The method of claim 1, further comprising fetching sequences of instructions into a cache memory while preventing instructions from being received into an instruction buffer until the branch instruction is re-executed.

5. The method of claim 1, further comprising recirculating the second instruction and the branch instruction in response to the detected condition.

6. The method of claim 1, further comprising flushing instructions subsequent to the second instruction from the execution pipeline when the second instruction is rejected.

7. The method of claim 6, where at least one of the flushed pipelines includes the execution pipeline of said branch instruction.

8. The method according to claim 1, further comprising:
   detecting a condition where the correct instruction path was not selected, the second instruction that precedes the branch instruction in the sequence of instructions is rejected, and instructions subsequent to the branch instruction can be flushed; and
   flushing instructions younger than the said branch from said instruction buffer.

9. The methods of claim 8, further comprising a case where instructions subsequent to the branch can be flushed when the second instruction is rejected due to a stall which does not require immediate recirculation of the second instruction, until the recirculation becomes eminent.

10. A method according to claim 9, where said stall which does not require immediate recirculation is a cache miss condition.

11. The method of claim 9, further comprising:
detecting a condition where the correct instruction path was not selected, a second instruction that precedes the branch instruction in the sequence of instructions is ready to be recirculated, and instructions subsequent to the branch instruction cannot be flushed; and
if the condition is detected, preventing instructions from being received into an instruction buffer until the rejected instruction and branch instruction are re-submitted for execution.

12. The method of claim 1, further comprising a case where instructions subsequent to the branch can be flushed when the second instruction is rejected due to a stall which does not require immediate recirculation of the second instruction, until the recirculation becomes eminent.

13. A digital processor, comprising
an instruction fetcher to fetch a sequence of instructions, and if a branch instruction is fetched, to predict whether the branch will be taken, and accordingly select an instruction path corresponding to the prediction;
an instruction buffer to receive instructions fetched by the instruction fetcher;
a first execution unit to execute the branch instruction and to determine a correct instruction path;
a second execution unit to execute a second instruction that precedes the branch instruction in the sequence of instructions;
detection circuitry to detect a condition where the correct instruction path was not selected, the second instruction is rejected, and instructions subsequent to the branch instruction cannot be flushed; and
control circuitry to prevent instructions from being received into the instruction buffer preceding the execution units when the condition is detected, until the rejected instruction is executed.

14. The processor of claim 13, further comprising a flush controller to flush the instruction buffer after the branch instruction is re-executed in response to the detected condition.

15. The processor of claim 13, further comprising a recirculation mechanism to recirculate the second instruction and the branch instruction in response to the detected condition.

16. The processor of claim 13, wherein the instruction fetcher is adapted to fetch sequences of instruction into a cache memory while instructions are prevented from being received into the instruction buffer until the branch instruction is re-executed.

17. The processor of claim 13, wherein the control circuitry is adapted to re-enable instructions to be received into the instruction buffer after the branch instruction is re-executed in response to the detected condition if the condition does not repeat.

18. A digital system for processing data, comprising:
a branch predictor to predict whether a branch instruction is taken and to select an instruction path corresponding to the prediction;
a branch processing unit to execute the branch instruction to determine a correct instruction path;
a detection unit to detect a condition where the correct instruction path was not selected, a second instruction that preceded the branch instruction is rejected, and instructions subsequent to the branch instruction cannot be flushed;
a dispatcher to resubmit the rejected second instruction for execution; and
a control unit to prevent instructions from being stored in an instruction buffer in response to the detected condition until the rejected second instruction is executed.

19. The system of claim 14, further comprising a flush controller to flush the instruction buffer after the second instruction is re-executed in response to the detected condition if the condition does not repeat.

20. The system of claim 15, wherein the flush controller is adapted to flush the instruction buffer if the condition is detected before the rejected instruction is recirculated if the rejected instruction followed the branch instruction.

* * * * *